Patented May 25, 1937

2,081,234

UNITED STATES PATENT OFFICE 2,081,234

PRODUCTION OF PRECIOUS METAL DECORATIONS ON CERAMIC OBJECTS

Alwin Hefter, Frankfort-on-the-Main, Germany, assignor to Deutsche Gold und Silber Scheideanstalt vormals Roessler, Frankfort-on-the-Main, Germany, a corporation of Germany No Drawing. Application January 9, 1935, Serial No. 1,024. In Germany January 9, 1934

5 Claims. (Cl. 91—70)

This invention relates to the production of precious metal decorations on ceramic objects such as stoneware, procelain and the like. More particularly, it relates to the use of precious metals in a finely divided form as for example, powdered gold or powdered silver, for producing decorations of this type.

The methods which have usually been used in the past in applying such decorations, consist in applying to the surface to be decorated a suitable lacquer containing resins, such as colophonium or synthetic resins, and then applying to the tacky lacquered surface the desired powdered metal e. g., gold, silver, etc. The decorated article is then fired at a temperature high enough to fuse the metal to the ceramic surface. The lacquer serves merely as a temporary means for causing the metal powder to adhere to the ceramic surface and is completely eliminated during the subsequent firing operation.

In order to improve the adhesive power and the firing characteristics of precious metal decorations produced in the above manner, it has been proposed to mix with the metal powder a certain amount of bismuth or its compounds. While the addition of bismuth compounds to the metal powder has some beneficial effect, the results obtained by this procedure are still not entirely satisfactory.

The present invention is based upon the discovery that appreciably better adhesive and polishing properties are obtained in the fired decoration if bismuth or its compounds are incorporated in the lacquer instead of being mixed with the metal powder as has been the prior practice. The bismuth may be added to the lacquer either as a suspended coloid or in dissolved form. Soluble bismuth compounds which are especially suitable for this purpose are the bismuth salts of the fatty acids, resin acids and naphthenic acids. In some cases it is preferable to dissolve the bismuth compound in a suitable solvent and then to add this solution to the lacquer.

As an example of one method of carrying out the invention, a lacquer is prepared by adding bismuth in the form of its naphthenic acid salt, to a resin solution. In general, satisfactory solutions of this type may contain from about 10% to 50% of bismuth naphthenate; for most types of work a bismuth naphthenate content of about 20%–30% is preferable. The lacquer prepared in this manner is applied to the article to be decorated, the metal powder is dusted on to the tacky lacquer surface, and the article is then fired in the usual manner to burn off the resin and to fuse the metal to the ceramic surface.

Further illustrations of suitable lacquer mixtures for use in applying metal decorations in accordance with the invention are given in the following examples:

Example 1.—Twelve and one-half grams of rubber resin and 25 grams of a bismuth salt of resinic acid containing 20% of $Bi_2O_3$ were dissolve in 62.5 grams of oil of turpentine.

Example 2.—Twenty-five grams of guttapercha resin and 25 grams of bismuth oleate containing 20% $Bi_2O_3$ were dissolved in 50 grams of oil of turpentine.

Example 3.—Ten per cent of $Bi_2O_3$ as the bismuth salt of naphthenic acid was dissolved in oil of turpentine.

Decorations applied in accordance with the foregoing invention possess, after firing, an exceptional degree of adhesive power to the ceramic surfaces, thus expediting polishing operations and producing decorations of a more durable nature than has been possible by prior methods. Furthermore, the use of lacquers containing bismuth makes it possible to use smaller amounts of the precious metal preparations to produce a given decorative effect than has been possible heretofore. A further advantage of these lacquers lies in the fact that they tend to prevent the metal powders from overruning the lacquered areas, thus facilitating the application of sharply defined designs.

In the appended claims the term "bismuth" is to be understood to refer to this element either in the form of the free metal or in the combined state.

I claim:

1. Method of decorating a ceramic surface which comprises applying thereto a lacquer containing bismuth, and thereafter applying precious metal powder on the lacquered surface.

2. Method of decorating a ceramic surface which comprises applying thereto a lacquer containing a bismuth compound dissolved therein, and thereafter applying precious metal powder on the lacquered surface.

3. Method of decorating a ceramic surface which comprises applying thereto a lacquer containing a bismuth salt of an organic acid, and thereafter applying precious metal powder on the lacquered surface.

4. Method of decorating a ceramic surface which comprises applying thereto a lacquer containing a bismuth salt of naphthenic acid, and thereafter applying precious metal powder on the lacquered surface.

5. A composition for applying powdered precious metal decorations to ceramic surfaces comprising a solution of a bismuth salt of naphthenic acid in a suitable solvent therefor.

ALWIN HEFTER.